United States Patent
Birk et al.

(10) Patent No.: US 7,676,284 B2
(45) Date of Patent: Mar. 9, 2010

(54) ELECTRICAL MOTOR DRIVE AND METHOD FOR OPERATING SUCH ELECTRICAL MOTOR DRIVE

(75) Inventors: Gunther Birk, Erlangen/Buckenhof (DE); Thomas Demuth, Limbach-Oberfrohna (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 11/906,899

(22) Filed: Oct. 4, 2007

(65) Prior Publication Data

US 2008/0091294 A1 Apr. 17, 2008

Related U.S. Application Data

(60) Provisional application No. 60/851,008, filed on Oct. 11, 2006.

(51) Int. Cl.
*G06F 19/00* (2006.01)
*G05D 3/12* (2006.01)

(52) U.S. Cl. .......................... 700/31; 318/616; 318/432

(58) Field of Classification Search ................ 700/29, 700/30, 31, 83; 318/611, 616, 432
See application file for complete search history.

(56) References Cited

U.S. PATENT DOCUMENTS

| | | | | |
|---|---|---|---|---|
| 5,115,418 A | * | 5/1992 | Shimada ...................... 318/616 |
| 5,545,957 A | * | 8/1996 | Kubo et al. .................. 318/432 |
| 5,587,636 A | * | 12/1996 | Bar-Kana et al. ........... 318/561 |
| 5,637,969 A | * | 6/1997 | Kato et al. ................... 318/432 |
| 5,652,491 A | * | 7/1997 | Ikawa et al. ................. 318/632 |
| 5,666,034 A | * | 9/1997 | Seoung et al. .................. 318/6 |
| 5,796,231 A | * | 8/1998 | Kyodo ........................ 318/608 |
| 5,994,868 A | * | 11/1999 | Takeuchi et al. ............ 318/616 |
| 6,316,893 B1 | * | 11/2001 | Rasimus ..................... 318/432 |
| 7,142,930 B2 | * | 11/2006 | Shimada et al. ............... 700/29 |
| 2003/0229408 A1 | * | 12/2003 | Yasui et al. .................... 700/30 |

FOREIGN PATENT DOCUMENTS

EP 0 958 898 A2 11/1999

\* cited by examiner

*Primary Examiner*—Albert DeCady
*Assistant Examiner*—Douglas S Lee

(57) ABSTRACT

A compensation of cyclical interferences occurring during operation of motor controlled by an electrical motor drive comprising the controllable motor and a speed governor, wherein a position determiner is provided for continuously determining a position of said motor, responsive to a position signal indicative of said position of said motor and wherein a load observer responsive to a first output signal received from said position determiner and to a second output signal received from the speed governor is provided for generating a load signal indicative of an estimated load and continuously applying said load signal to an output of the speed governor.

10 Claims, 3 Drawing Sheets

ELECTRICAL MOTOR DRIVE AND METHOD FOR OPERATING SUCH ELECTRICAL MOTOR DRIVE

CROSS REFERENCE TO RELATED APPLICATIONS

The present application claims the benefit of the provisional patent application filed on Oct. 11, 2006, and assigned application No. 60/851,008, and is incorporated by reference herein in its entirety.

FIELD OF INVENTION

The present invention relates to an electrical motor drive and to a method for operating such electrical motor drive. More particularly to such apparatus or method for use in any kind of production machinery, such as a digitally programmed machine tool, provided for adaptively compensating for a load change. The apparatus and corresponding method can therefore be termed as cyclical load observer for a compensation of cyclical interferences or cyclical load observing method for a compensation of cyclical interferences.

BACKGROUND OF INVENTION

Electrical motor drives are known per se. A quality of workpieces, which are by way of example machined by production machinery employing such motor drives, is clearly dependent on a circularity (radial runout) of the rotational motion of a shaft driven by the motor and/or a workpiece attached thereto. A corrugation or undulation of the rotational speed or angular speed, and depending thereon an accuracy of a desired rotational position or angular position, are determined by the quality of the control circuit, more particularly by the quality of the closed loop comprised in the control circuit, the driven load, and interferences. The latter can be distinguished in static interferences and methodic interferences. Static interferences occur as a matter of principle. Furthermore, the occurrence of static interferences is periodical or cyclical, when the underlying motion is either a uniform motion or a repetitive motion. Static or cyclic interferences thus can be perceived as a speed-dependent disturbance, where specifically a frequency of such cyclic interferences is dependent of the speed of the rotational motion.

SUMMARY OF INVENTION

Due to the dynamics of the relevant closed loop a compensation of such cyclic interferences has so far only been achieved for relatively low rotational speeds. For high end speeds the mass of the rotation load smoothes such cyclic interferences. For medium range speeds such cyclic interferences have so far often resulted in poor or unacceptable irregularities in the control action of e.g. a speed governor employed in the control circuit.

Known approaches attempt to rely on employing interferences determined during a first period in the motion of the motor in a subsequent period in the sense of a disturbance variable. Specifically, the approach in EP 0 958 898 A1 aims at adaptively compensating for load changes by determining as a function of time at regular intervals, during the load change, an estimate for an external torque disturbance which causes load changes, and employing the torque disturbance estimate determined during the previous load change for compensating for the external torque disturbance in controlling the torque of the motor. This iterative approach suffers from drawbacks which are inherently combined with iterative control or discrete control, such as the well-known effect that although a controller may be stable when implemented as an analog controller, it could be unstable when implemented as a digital controller.

One object of the invention is to provide an alternative solution for a compensation of cyclical interferences, more particularly a solution avoiding or at least alleviating problems and drawbacks described above.

This is achieved by an electrical motor drive and by the method having the features defined in the independent claims.

The aforementioned electrical motor drive comprises a controllable motor and a speed governor, both comprised in a control circuit. The electrical motor drive further comprises a position determining means and a load observing means. The position determining means is provided for determining a position, more particularly a rotational position, of said motor and is responsive to a position signal indicative of said position of said motor. The load observing means is responsive to a first output signal received from the position determining means and to a second output signal received from the speed governor. A load signal, indicative of an estimated load and generated through said load observing means, is fed into the control circuit downstream of the speed governor for adaptively compensation for load changes during operation of the motor. The aforementioned position signal indicative of the position of the motor must not necessarily be obtained directly at the relevant motor but could be obtained at any device, such as a roller, directly or indirectly driven by the motor. With such device being directly or indirectly driven by the motor any position of any such device is in turn indicative of said position of said motor.

The aforementioned method for operating an electrical motor drive comprising a controllable motor and a speed governor, both comprised in a control circuit, and for adaptively compensating for a load change during operation of the motor involves the steps of determining a position, more particularly a rotational position, of said motor, determining a load signal indicative of an estimated load of the motor, and feeding the load signal into the control circuit downstream of the speed governor. The position is determined through a position determining means on the basis of a position signal indicative of said position of the motor. A first output signal indicative of the position of the motor is generated by the position determining means and further employed in subsequent steps when employing the method. The load signal is generated through a load observing means, which is responsive to said first output signal and to a second output signal received from the speed governor.

The dependent claims outline advantageous forms of embodiment of the apparatus of the method according to the invention.

Preferably said second output signal reflects a proportional action of said speed governor.

Advantageously said second output signal, indicative of a control action of the speed governor, is mapped onto a load cycle of the motor by means of the first output signal received from the position determining means.

When the control action of the speed governor is mathematically integrated and stored in a control memory, advantageously not only the latest disturbances are accounted for but a successive number of preceding disturbances weighed with a factor reflecting how "old" the relevant disturbance is. Thus the true dynamics of the disturbances are considered in approach.

When the control memory comprises a plurality of control memory cells, wherein each control memory cell is associated with an angular position of the motor during its load cycle, the possibility arises for the control action of the speed governor being mapped onto the load cycle of the motor, in that the second output signal, being indicative of said control action, is accounted for in one of said control memory cells, wherein said one of said control memory cells is selected on account of the first output signal received from the position determining means. A measure for the control action is thus stored in a cell of the control memory which is associated with the angular position of the motor which caused the control action. In the next cycle of the motion, more particularly the rotational motion, once the same or a sufficiently close position, e.g. angular position, is reached, the control action applied during the preceding cycle can be applied for the current cycle. Application of the control action thus becomes independent of the angular speed of the motor. Accordingly the apparatus is adapted to "learn" the relevant control action required for a specific angular position. Furthermore this step of learning can be performed when the motor is operated at relatively low speed. When the motor is later operated at normal speed, i.e. with an angular speed higher than the angular speed employed during the learning phase, further learning, i.e. further changes to the contents of the control memory cells, can be deactivated and the control action required for a certain angular position can be applied to the closed loop during such normal speed operation also.

When the load signal is derived on the basis of an interpolation of a contents of neighbouring control memory cells, a relatively low number of control memory cells can suffice for modelling a full period of the angular motion of the motor with a required accuracy. For example, the control memory can consist of a number of 360, 180 or 90, etc. control memory cells, each being provided for storing the control action associated with the angular position corresponding to the relative position of the cell within the control memory. Thus the analog control action is discretizised on account of the number of control memory cells, where such discretization is partly reverse by interpolating a given number, i.e. a predetermined or predeterminable, number of neighbouring cells.

Interpolation a number of neighbouring cells is facilitated when the control memory is organised as a ring buffer. A "first" or a "last" cell in a thus organised control memory can easily be assessed as being neighboured to the last or first cell respectively, and so on.

The quality of the load signal can be improved when means for a phase correction of the load signal are employed.

The quality of the load signal can alternatively or additionally be improved when filtering means for limiting a frequency range of the load signal are employed.

The essential advantages of the invention are that the apparatus or corresponding method is provided for and capable of continuously determining an angular position of the motor and a load associated therewith, and continuously applying a load signal based on both the relevant angular position and the load associated therewith to the control circuit. Thus the load signal is attributed to the underlying angular motion of the motor and more particularly discrete load signals are attributed to discrete angular positions or position ranges. Applicable load signals can thus be gathered when the motor is in motion but not in productive operation in the sense that e.g. no workpiece is machined. Once load signals are available the same can be applied to the control circuit in productive operation.

BRIEF DESCRIPTION OF THE DRAWINGS

Other features and advantages of the present invention will appear from the following description of a preferred embodiment of the invention, given as a non-limiting example, illustrated in the drawings. All the elements which are not required for the immediate understanding of the invention are omitted. In the drawing, the same elements are provided with the same reference numerals in the various figures, an in which.

DETAILED DESCRIPTION OF INVENTION

In the following description, for purposes of explanation and not limitation, specific details are set forth, such as particular embodiments, data flows, signalling implementations, interfaces, techniques, etc. in order to provide a thorough understanding of the present invention. However, it will be apparent to one skilled in the art that the present invention may be practiced in other embodiments that depart from these specific details. For example, while the present invention is sometimes described in the context of digitally programmed machine tools, those skilled in the art will appreciate that the present invention can be implemented in any kind of production machinery using a variety of methods for implementing the means or the method steps mentioned above or described below. In other instances, detailed descriptions of well-known methods, interfaces, devices, and signalling techniques are omitted so as not to obscure the description of the present invention with unnecessary detail.

Figure 1:
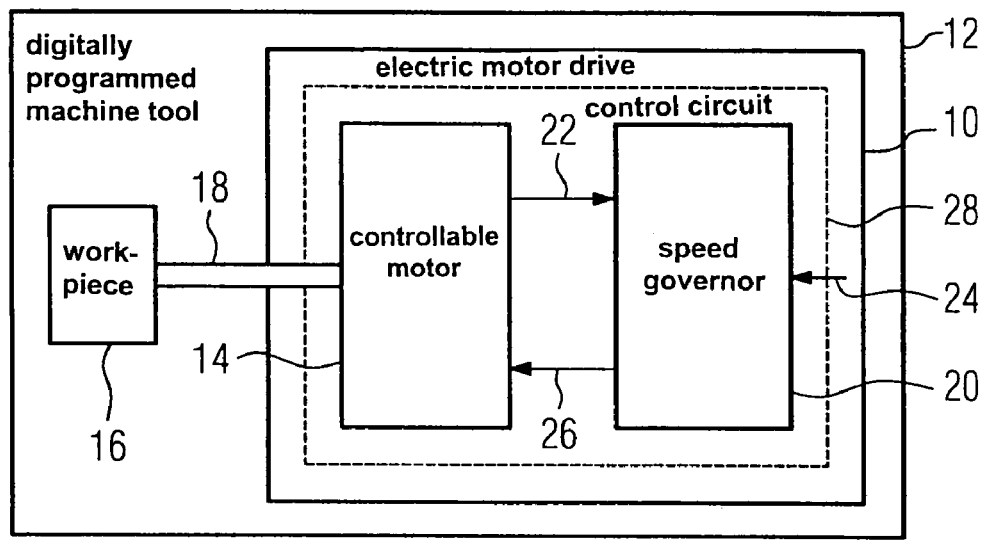
FIG. 1 is a simplified block diagram of a digitally programmed machine tool comprising a motor drive.

FIG. 1 is a schematic diagram of an electric motor drive 10 which could be part of any kind of production machinery, such as a digitally programmed machine tool 12. The electric motor drive 10 comprises a controllable motor 14, which has, by way of example, a workpiece 16 provided for being machine in the machine tool 12, attached to its shaft 18.

The motor drive 10 further comprises a speed governor 20 capable of processing a speed signal 22 received from the motor 14 and indicative of a velocity of the motor 14, such as the motor's rotational speed. Although the approach described herein is applicable both for linear and angular motion, the description shall continue with reference to angular motion without limiting the approach in this regard.

The speed governor 20 further receives a setpoint signal 24, indicative of a nominal value of the speed, e.g. rotational speed, of the shaft 18. On the basis of both the speed signal 22 and the setpoint signal 24 a control signal 26 is derived which is fed to the motor 14.

Figure 2:
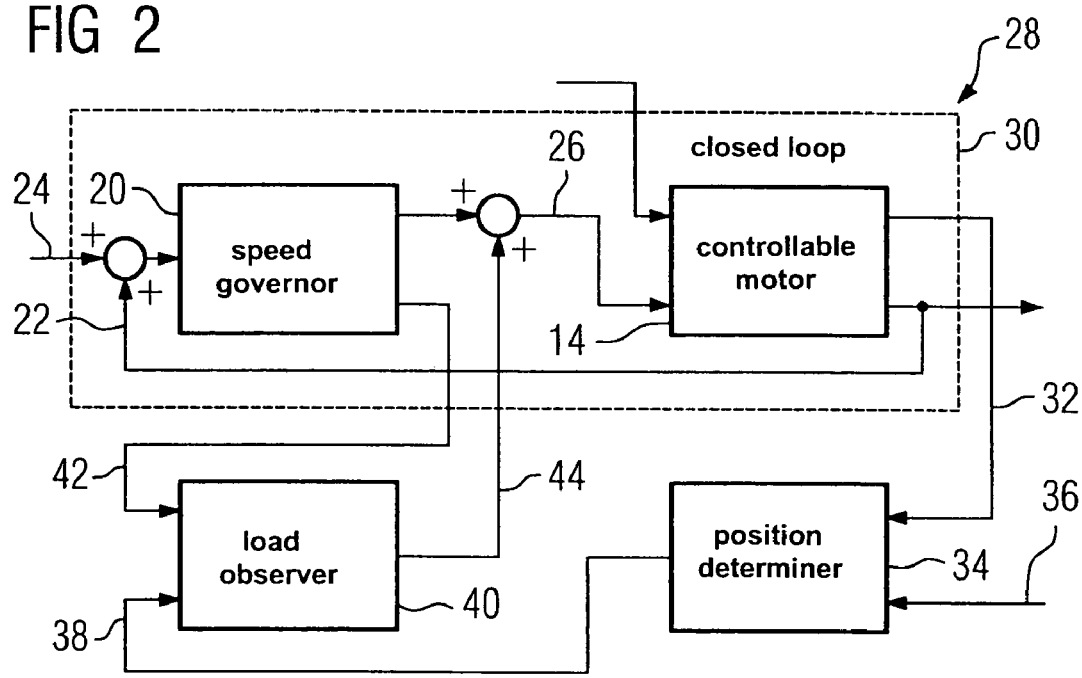
FIG. 2 is a simplified block diagram of a control circuit comprised in the motor drive.

Both the electrical motor 14 and the speed governor 20 are comprised in a control circuit 28, which is only schematically depicted in FIG. 1 and shown in more detail in FIG. 2. Thus the description commences with reference to FIG. 2.

FIG. 2 is a block diagram of the control circuit 28 comprised in the motor drive 10 (FIG. 1). The control circuit 28 comprises a closed loop 30, providing a state of the art functionality for controlling the motor's rotational speed on account of the setpoint signal 24, the speed signal 22 derived from the motor's actual rotational speed and the control signal 26 generated by the speed governor 20.

The approach according to the invention proposes to monitor position of the shaft 18 (FIG. 1), more particularly the rotational or angular of this shaft 18, and to this end a position signal 32 is derived from the motor 14 and fed to a position determining means 34. The position determining means 34 is or can be responsive to a second position signal 36, indicative of an expected position of the motor shaft 18, which can be, by way of example, derived from protocol values. The output of the position determining means 34 is fed as a first output signal 38 to a load observing means 40, which is also responsive to a second output signal 42 received from the speed governor 20. A load signal 44, indicative of an estimated load and generated through said load observing means 40, is then fed into the control circuit 28, namely into the closed loop 30, downstream of the speed governor 20 in order to account for load changes.

Depending on the layout of the control functionality of the speed governor 20, the second output signal 42 preferably reflects a proportional action of said speed governor 20.

Figure 3:
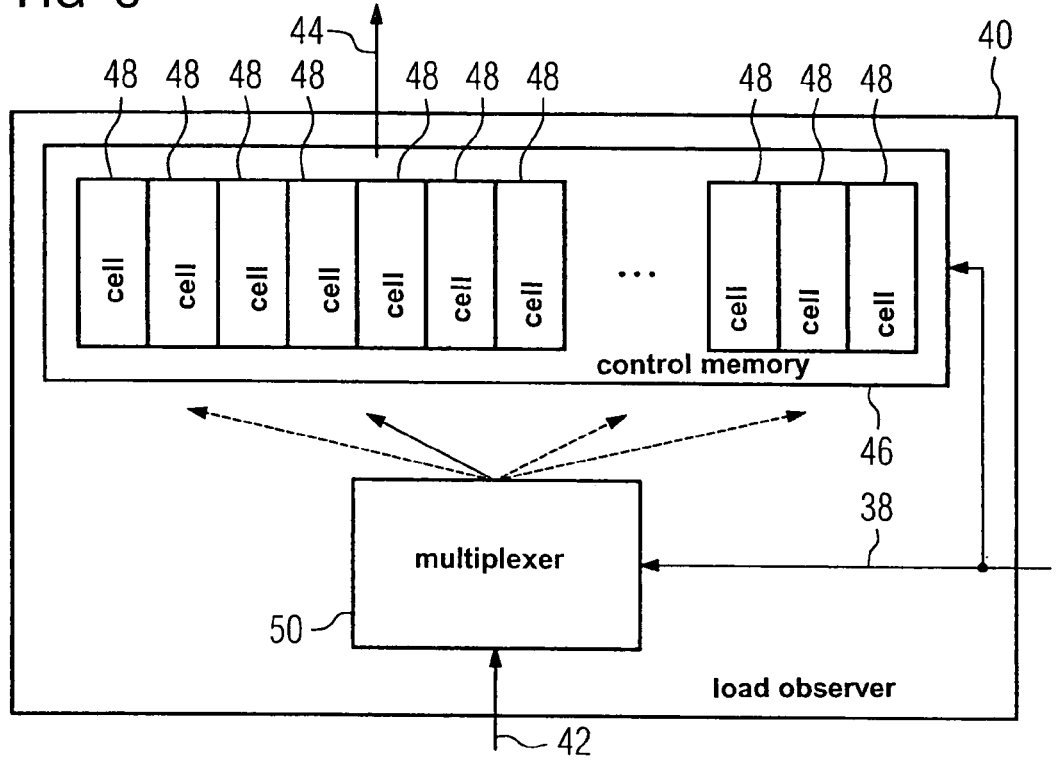
FIG. 3 is a simplified block diagram of a load observing means comprised in the control circuit.

FIG. 3 is a block diagram of the load observing means 40 with further details. According to FIG. 3 the load observing means 40 comprises a control memory 46, the latter comprising a number of control memory cells 48. The number of control memory cells 48 would advantageously reflect to a certain extend a full period of angular movement of the motor 14 (FIG. 1). Thus the control memory 46 might comprise 360, 180, 90, 60, 30, etc. control memory cells 48. Depending on the number of control memory cells 48, each control memory cell 48 represents a certain angular position of the motor or a certain range of consecutive angular positions. For example, with the control memory 46 comprising thirty control memory cells 48, each control memory cell 48 represents twelve angular degrees, in that a first control memory cell represents an angular position of the motor 14 in the interval of [0°-11°], a second control memory cell represents an angular position of the motor 14 in the interval of [12°-23°], . . . , etc., and a 30$^{th}$ control memory cell represents an angular position of the motor 14 in the interval of [349°-360°].

The load observing means 40 is responsive to the first output signal 38 received from the position determining means 34 and to the second output signal 42 received from the speed governor 20 (FIG. 1, FIG. 2). Internally both the first and second output signal 38, 42 are processed by a multiplexing means 50. Said multiplexing means 50 functions in the way that the first output signal 38, representing the angular position of the motor 14, is employed for an applicable control memory cell 48 associated with the relevant angular position or the first output signal 38. The second output signal 42 is then fed into the thus selected control memory cell 48 (shown in FIG. 3 as the solid and dashed arrows between the multiplexing means 50 and the control memory 46). Feeding the second output signal 42 into a control memory cell 48 can refer to a value indicative of the second output signal 42 being stored into the memory cell 48. However, feeding can also refer to various types of mathematical operation involving the value currently stored in the memory cell 48 as well as the value indicative of the second output signal 42, such as, by way of example, a mathematical integration. The resulting value stored in the memory cell 48 thus not only reflects the instantaneous second output signal, i.e. the control action of the speed governor 20 but "historical" values also.

The first output signal 38 is also fed to the control memory 46 in order for enabling the control memory 46 to output the contents of the relevant control memory cell 48 selected by the first output signal 38 as the load signal 44 which is then fed into the control circuit 28 downstream of the speed governor 20 (FIG. 2).

The apparatus shown in FIG. 3, i.e. the load observing means 40, in short "the load observer", or the method employing such means can be perceived as an apparatus or method for learning which angular position of the motor requires which control action for compensating cyclical interferences. Preferably such learning can be performed when the motor is operated at a relatively low speed. Once sufficient data is accumulated in the control memory 46 further changes to the contents of the control memory cells 48, can be deactivated and the control action required for a certain angular position can be applied to the closed loop during such normal speed operation also. Such deactivation can be performed by opening the signal path for the second output signal 42 to the multiplexing means 50, by deactivating the multiplexing means 50, or by deactivating the signal path for the first output signal 38 to the multiplexing means 50 such that no control memory cell is selected or selectable. Once such deactivation has been performed, the apparatus and the corresponding method can by employed on the basis of the contents of the control memory 46 and the first output signal 38 to which the control memory responds when outputting the load signal 44.

Figure 4:
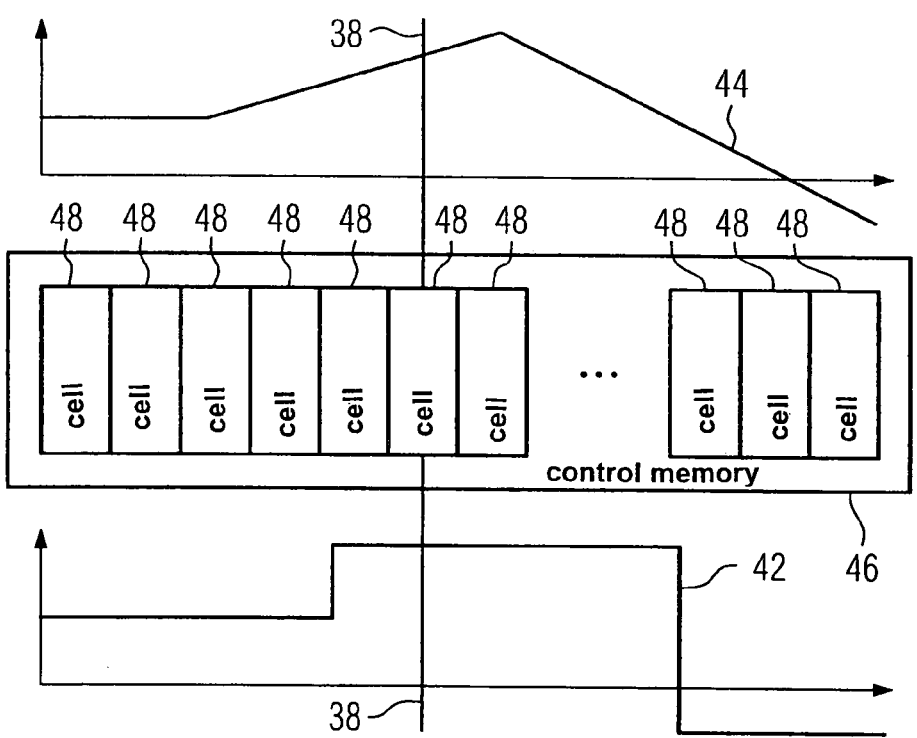
FIG. 4 is as simplified diagram of a signal to which the load observing means is responsive and a signal generated by the load observing means over an abscissa which represents a full period of angular movement of the motor.

FIG. 4 shows as simplified diagram of the second output signal 42 and load signal 44 over an abscissa which represents a full period of angular movement of the motor 14 (FIG. 1). Thus the instantaneous value of the second output signal 42 and the load signal 44 is linked to an instantaneous angular position of the motor 14, which is represented by the first output signal 38 and thus linked to the first output signal 38 also. The instantaneous angular position of the motor 14 is shown in FIG. 4 as a vertical line, denoted with the reference numeral 38. The second output signal 42 is employed for gathering data for the control memory 46 as described above in connection with FIG. 3. The load signal 44 is derived on the basis of the contents of a single control memory cell 48 or a plurality of control memory cells 48, which is or which are selected on account of the first output signal 38. The diagonal portions in the trend of the load signal 44 over a full period of angular motion results from a plurality of neighbouring control memory cells 48 being employed for generation the load signal 44. Employing a plurality of neighbouring control memory cells 48 can here mean interpolation of the contents of the relevant control memory cells 48 or any other meaningful mathematical operation involving the contents of more than one control memory cell 48. Involving more than one control memory cell 48 when generating the load signal 44 is facilitated when the control memory 46 is organised in the form of a ring buffer (not specifically shown), so that a first control memory cell is neighbouring a last control memory cell and vice versa.

Figure 5:
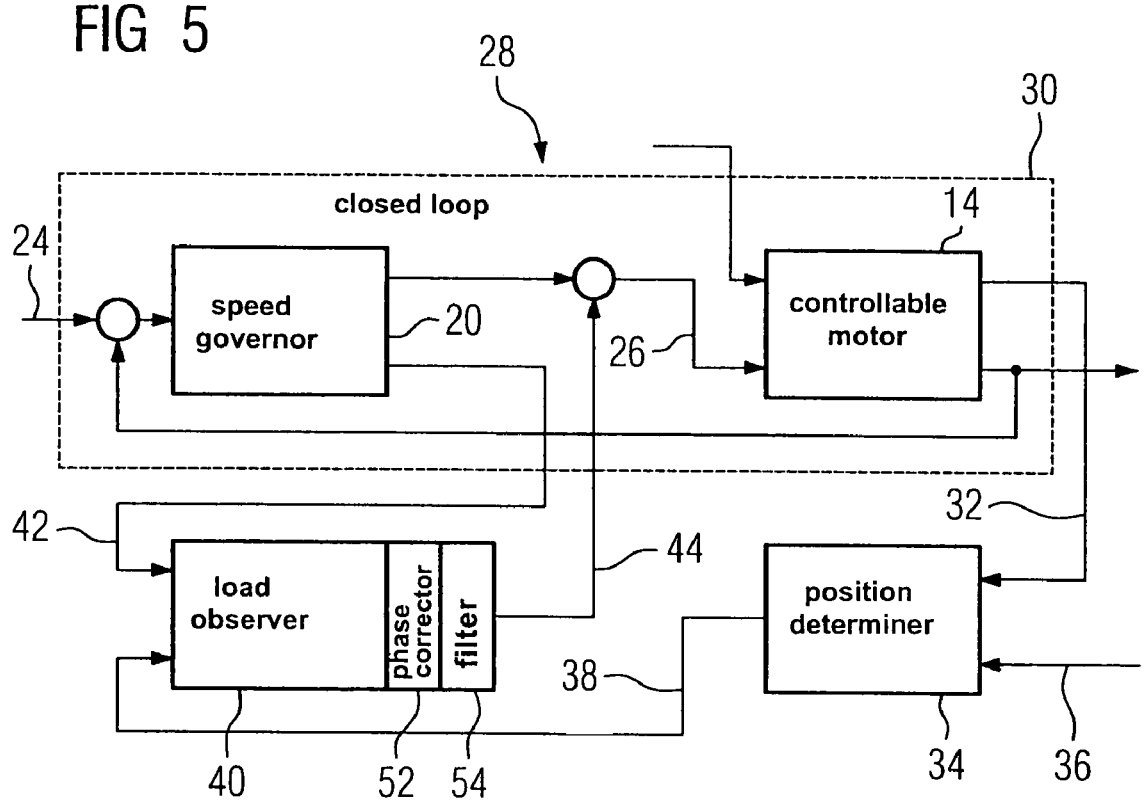
FIG. 5 is a modified block diagram of the control circuit shown in FIG. 2.

FIG. 5 finally show a slightly modified block diagram of the control circuit 28 comprised in the motor drive 10 (FIG. 1) as opposed to the block diagram shown in FIG. 2. The modified control circuit 28 accounts for an advantageous embodiment where the quality of the load signal 44 is improved by employing a means 52 for a phase correction of the load signal 44 and/or filtering means 54 for limiting a frequency range of the load signal 44.

Summarizing the above the invention can briefly be described as relating to a method and apparatus for a compensation of cyclical interferences occurring during operation of motor 14 controlled by an electrical motor drive 10 comprising the controllable motor 14 and a speed governor 20, wherein a position determining means 34 is provided for continuously determining a position of said motor 14, responsive to a position signal 32 indicative of said position of said motor 14 and wherein a load observing means 40 responsive to a first output signal 38 received from said position determining means 34 and to a second output signal 42 received from the speed governor 20 is provided for generating a load signal 44 indicative of an estimated load and continuously applying said load signal to an output of the speed governor 20.

Although a preferred embodiment of the invention has been illustrated and described herein, it is recognized that changes and variations may be made without departing from the invention as set forth in the claims.

The invention claimed is:

1. An electrical motor drive comprising a controllable motor and a speed governor comprised in a control circuit, comprising:
   a positions signal indicates a position of said motor is derived from said motor;
   a position determiner continuously determines a rotational position of said motor via the position signal and produces a first output signal; and
   a load observer responsive to said first output signal and to a second output signal received from said speed governor,
   wherein a load signal indicative of an estimated load and generated through said load observer is continuously fed into the control circuit downstream of said speed governor,
   wherein said second output signal, indicative of a control action of the speed governor, is mapped onto a load cycle of said motor via said first output signal,
   wherein said control action of said speed governor is mathematically integrated and stored in a control,
   wherein said control memory comprises a plurality of control memory cells, each control memory cell is associated with a position of the motor during its load cycle, and
   wherein said control action of said speed governor is mapped onto said load cycle of the motor in that said second output signal is accounted for in one of said control memory cells, wherein said one of said control memory cells is selected on account of said first output signal.

2. The electrical motor drive according to claim 1, wherein said second output signal reflects a proportional action of said speed governor.

3. The electrical motor drive according to claim 1 wherein said load signal is derived on the basis of an interpolation of a content of neighbouring control memory cells.

4. The electrical motor drive according to claim 3, wherein said control memory is organized as a ring buffer.

5. The electrical motor drive according to claim 1, comprising a phase corrector of said load signal.

6. The electrical motor drive according to claim 1, further comprising a filter for limiting a frequency range of the load signal.

7. A method for operating an electrical motor drive comprising a controllable motor and a speed governor comprised in a control circuit for adaptively compensating for a load change, the method comprising:
   continuously determining a rotational position of said motor and providing a first output signal indicative thereof through a position determiner based on a position signal indicative of said position of said motor;
   continuously determining a load signal indicative of an estimated load and generated through a load observer, said load observer being responsive to said first output signal and to a second output signal received from said speed governor; and
   continuously feeding the load signal into said control circuit downstream of said speed governor,
   wherein said determining said load signal involves said second output signal being mapped onto a load cycle of the motor via said first output signal,
   wherein the step of determining a load signal further involves said control action of the speed governor being mathematically integrated and stored in a control memory,
   wherein said control memory comprises a plurality of control memory cells, each control memory cell being associated with a position of the motor during said load cycle, and
   wherein said step of determining said load signal further involves said control action of said speed governor being mapped onto the load cycle of the motor in that said second output signal is accounted for in one of said control memory cells, wherein said one of said control memory cells is selected on account of said first output signal.

8. The method according to claim 7, wherein during said determining said load signal, said second output signal reflects a proportional action of said speed governor.

9. The method according to claim 7, wherein said step of determining said load signal further involves said load signal being derived based on an interpolation of a contents of neighbouring control memory cells.

10. The method according to claim 9, wherein said control memory is organized as a ring buffer.

* * * * *